US012600138B2

(12) United States Patent
Jin et al.

(10) Patent No.: US 12,600,138 B2
(45) Date of Patent: Apr. 14, 2026

(54) MAINTENANCE ASSEMBLY FOR AN INKJET HEAD, MAINTENANCE METHOD FOR AN INKJET HEAD AND APPARATUS FOR PROCESSING A SUBSTRATE INCLUDING A MAINTENANCE ASSEMBLY FOR AN INKJET HEAD

(71) Applicant: SEMES CO., LTD., Cheonan-si (KR)

(72) Inventors: Won-Yong Jin, Jeonju-si (KR); Hosang Lee, Asan-si (KR); Jiyun Ahn, Cheonan-si (KR); Jae-Duck Lee, Seongnam-si (KR); Suk-Won Jang, Pyeongtaek-si (KR)

(73) Assignee: Semes Co., Ltd., Cheonan-si (KR)

( * ) Notice: Subject to any disclaimer, the term of this patent is extended or adjusted under 35 U.S.C. 154(b) by 265 days.

(21) Appl. No.: 18/307,496

(22) Filed: Apr. 26, 2023

(65) Prior Publication Data

US 2023/0364914 A1 Nov. 16, 2023

(30) Foreign Application Priority Data

May 12, 2022 (KR) ........................ 10-2022-0058168

(51) Int. Cl.
*B41J 2/165* (2006.01)

(52) U.S. Cl.
CPC ....... *B41J 2/16579* (2013.01); *B41J 2/16532* (2013.01); *B41J 2002/16582* (2013.01)

(58) Field of Classification Search
CPC .............................. B41J 2/16579; B41J 2/165
See application file for complete search history.

(56) References Cited

U.S. PATENT DOCUMENTS

2019/0176474 A1* 6/2019 Nakamura ............... B41J 2/195

FOREIGN PATENT DOCUMENTS

| | | | | | |
|---|---|---|---|---|---|
| JP | 2002-234174 | A | | 8/2002 | |
| JP | 2006341541 | A | * | 12/2006 | .............. B41J 2/165 |
| JP | 2007-090746 | A | | 4/2007 | |
| JP | 2010210739 | A | * | 9/2010 | |
| JP | 2014-111381 | A | | 6/2014 | |
| JP | 2019-104133 | A | | 6/2019 | |
| JP | 2022059030 | A | * | 4/2022 | |
| KR | 10-2012-0105871 | A | | 9/2012 | |
| KR | 10-1265144 | B1 | | 5/2013 | |
| KR | 10-1696195 | B1 | | 1/2017 | |
| KR | 10-2021-0050520 | A | | 5/2021 | |

* cited by examiner

*Primary Examiner* — Sharon Polk
(74) *Attorney, Agent, or Firm* — Harness, Dickey & Pierce, P.L.C.

(57) ABSTRACT

A maintenance assembly for an inkjet head may include a housing having an upper face facing a nozzle face on which nozzles for discharging a chemical liquid on a substrate are arranged, and an atmosphere generating part for providing an atmosphere including humidity around the nozzles and the nozzle face such that a humidity of the nozzles and a humidity of the nozzle face are adjusted to a set humidity if the humidity of the nozzles and the humidity of the nozzle face are different from the set humidity.

19 Claims, 3 Drawing Sheets

MAINTENANCE ASSEMBLY FOR AN INKJET HEAD, MAINTENANCE METHOD FOR AN INKJET HEAD AND APPARATUS FOR PROCESSING A SUBSTRATE INCLUDING A MAINTENANCE ASSEMBLY FOR AN INKJET HEAD

CROSS-REFERENCE TO RELATED APPLICATION

This application claims priority to Korean Patent Application No. 10-2022-0058168 filed on May 12, 2022 in the Korean Intellectual Property Office (KIPO), the contents of which are herein incorporated by reference in its entirety.

BACKGROUND

1. Field

Example embodiments of the invention relate to a maintenance assembly for an inkjet head, a maintenance method for an inkjet head and an apparatus for processing a substrate including a maintenance assembly for an inkjet head. More particularly, example embodiments relate to maintenance assembly for an inkjet head capable of maintaining a nozzle face of an inkjet head to meet predetermined set conditions, a maintenance method for an inkjet head using such a maintenance assembly for an inkjet head, and an apparatus for processing a substrate including the maintenance assembly for an inkjet head.

2. Related Technology

To manufacture a display device such as an organic light emitting display (OLED) device or a quantum dot light emitting display (QLED) device, a process for dispensing a liquid chemical onto a substrate, this process for dispensing the liquid chemical may generally be performed using an apparatus for processing a substrate including an inkjet head having a nozzle face on which a plurality of nozzles are arranged.

In the process for dispensing the liquid chemical onto the substrate, a failure of the process may be caused if the chemical liquid remains in the nozzles of the inkjet head or on the nozzle face of the inkjet head. Thus, a maintenance process is performed to clean the chemical liquid remaining in the nozzles or on the nozzle face. In addition, the chemical liquid used for manufacturing the display device may be very sensitive to a surrounding environment including humidity so that the surrounding environment to the chemical liquid is needed to be carefully maintained as well as process conditions including a humidity to the nozzles and the nozzle face of the inkjet head is needed to maintained.

According to the conventional technology, a maintenance process for removing the chemical liquid remained in the nozzles or the nozzle face of the inkjet head may not be sufficiently performed even though a maintenance process for keeping the process conditions including the humidity in the nozzles or on the nozzle face may be executed.

SUMMARY

It is one object of the invention to provide a maintenance assembly for an inkjet head, which can capable of advantageously maintaining process conditions including humidity for nozzles of the inkjet head and/or a nozzle face of the inkjet head.

It is another object of the invention to provide a maintenance method for an inkjet head, which can capable of advantageously maintaining process conditions including humidity for nozzles of the inkjet head and/or a nozzle face of the inkjet head.

It is still another object of the invention to provide an apparatus for processing a substrate including a maintenance assembly for an inkjet head capable of advantageously maintaining process conditions including humidity for nozzles of the inkjet head and/or a nozzle face of the inkjet head.

According to an aspect of the invention, there is provided a maintenance assembly for an inkjet head. The maintenance assembly for an inkjet head may include a housing having an upper face facing a nozzle face on which nozzles for discharging a chemical liquid on a substrate are arranged, and an atmosphere generating part for providing an atmosphere including humidity around the nozzles and the nozzle face such that a humidity of the nozzles and a humidity of the nozzle face are adjusted to a set humidity if the humidity of the nozzles and the humidity of the nozzle face are different from the set humidity.

In example embodiments, the atmosphere generating part may include a receiving part being in fluid communication with the upper face of the housing and receiving a humidity control agent, a supply line providing the humidity control agent into the receiving part from an external humidity control agent source, and a discharge line for discharging the humidity control agent from the receiving part to an outside.

In example embodiments, the maintenance assembly for an inkjet head may additionally include a supply adjusting part for controlling an amount of the humidity control agent provided into the receiving part, and a discharge adjusting part for controlling an amount of the humidity control agent discharged from the receiving part.

In example embodiments, the maintenance assembly for an inkjet head may additionally include a humidity sensing part for measuring the humidity of the nozzles and the humidity of the nozzle face. The supply adjusting part and the discharge adjusting part may adjust the amount of the humidity control agent provided into the receiving part and the amount of the humidity control agent discharged from the receiving part in accordance with results measured by the humidity sensing part.

In example embodiments, the maintenance assembly for an inkjet head may additionally include a pressure controlling part for constantly maintaining a pressure between the upper face of the housing and the nozzle face.

In example embodiments, the humidity control agent may be selected from a desiccant in a granular form, a dehumidifying agent in a granular form and a combination thereof.

In example embodiments, the maintenance assembly for an inkjet head may additionally include an atmosphere distributing part for uniformly distributing the atmosphere including humidity around the nozzles and the nozzle face. The atmosphere distributing part may have a mesh structure.

In example embodiments, the maintenance assembly for an inkjet head may additionally include a guide part for maintaining a constant distance between the upper face of the housing and the nozzle face.

In example embodiments, the maintenance assembly for an inkjet head may additionally include a chemical liquid collecting part for collecting a remaining chemical liquid or a falling chemical liquid from the nozzles and the nozzle face in a vacuum suction manner.

In example embodiments, the chemical liquid collecting part may include a chemical liquid receiving part for receiving the remaining chemical liquid or the falling chemical liquid, a chemical liquid discharging part for temporally storing and discharging the remaining chemical liquid or the falling chemical liquid, and a connection line coupled to the chemical liquid receiving part and the chemical liquid discharging part.

According to another aspect of the invention, there is provided a maintenance method for an inkjet head. The maintenance method for an inkjet head may include measuring a humidity of nozzles for discharging chemical liquid onto a substrate and a humidity of a nozzle face on which the nozzles are arranged, and adjusting the humidity of the nozzles and the humidity of the nozzle face to a set humidity if the measured humidity of the nozzles and the measured humidity of the nozzle face ate different from the set humidity.

In example embodiments, the humidity of the nozzles and the humidity of the nozzle face may be adjusted by providing an atmosphere including humidity formed using a humidity control agent around the nozzles and the nozzle face. The humidity control agent may be selected from a desiccant in a granular form, a dehumidifying agent in a granular form and a combination thereof.

In example embodiments, the maintenance method for an inkjet head may additionally include collecting a remaining chemical liquid or a falling chemical liquid from the nozzles and the nozzle face in a vacuum suction manner.

In example embodiments, the adjusting of the humidity of the nozzles and the humidity of the nozzle face may be performed when the nozzles do not discharge the chemical liquid onto the substrate.

According to still another aspect of the invention, there is provided an apparatus for processing a substrate. The apparatus for processing a substrate may include an inkjet head having a nozzle face on which nozzles for discharging a chemical liquid onto a substrate are arranged, and a maintenance assembly for performing a maintenance to the inkjet head. The maintenance assembly may include a housing having an upper face facing the nozzle face, and an atmosphere generating part for providing an atmosphere including humidity formed using a humidity control agent around the nozzles and the nozzle face such that a humidity of the nozzles and a humidity of the nozzle face are adjusted to a set humidity if the humidity of the nozzles and the humidity of the nozzle face are different from the set humidity.

In example embodiments, the atmosphere generating part may include a receiving part being in fluid communication with the upper face of the housing and receiving a humidity control agent, a supply line providing the humidity control agent into the receiving part from an external humidity control agent source, a discharge line for discharging the humidity control agent from the receiving part to an outside, a supply adjusting part for controlling an amount of the humidity control agent provided into the receiving part, and a discharge adjusting part for controlling an amount of the humidity control agent discharged from the receiving part.

In example embodiments, the apparatus for processing a substrate may additionally include a humidity sensing part for measuring the humidity of the nozzles and the humidity of the nozzle face. The supply adjusting part and the discharge adjusting part may adjust the amount of the humidity control agent provided into the receiving part and the amount of the humidity control agent discharged from the receiving part in accordance with results measured by the humidity sensing part.

In example embodiments, the apparatus for processing a substrate may additionally include an atmosphere distributing part for uniformly distributing the atmosphere including humidity around the nozzles and the nozzle face. The atmosphere distributing part may have a mesh structure. Further, the apparatus for processing a substrate may include a guide part for maintaining a constant distance between the upper face of the housing and the nozzle face.

In example embodiments, the humidity control agent may be selected from a desiccant in a granular form, a dehumidifying agent in a granular form and a combination thereof.

In example embodiments, the apparatus for processing a substrate may additionally include a chemical liquid collecting part for collecting a remaining chemical liquid or a falling chemical liquid from the nozzles and the nozzle face in a vacuum suction manner. The chemical liquid collecting part may include a chemical liquid receiving part for receiving the remaining chemical liquid or the falling chemical liquid, a chemical liquid discharging part for temporally storing and discharging the remaining chemical liquid or the falling chemical liquid, and a connection line coupled to the chemical liquid receiving part and the chemical liquid discharging part.

According to example embodiments, when the process for discharging the chemical liquid onto the substrate from the inkjet head is not performed, the maintenance assembly for the inkjet head may perform the maintenance to the inkjet head so that the nozzles and/or the nozzle face may have the predetermined set humidity. Particularly, the humidity in the nozzles and/or on the nozzle face of the inkjet head may be measured, and the humidity in the nozzles and/or on the nozzle face may be adjusted to the predetermined set humidity in accordance with the measured results if the measured humidity in the nozzles and/or on the nozzle face is different from the set humidity. In this case, the maintenance assembly may be readily coupled/separated to/from the inkjet head such that the maintenance for the inkjet head may be easily performed. Further, the humidity of the nozzles and the humidity of the nozzle face may be advantageously adjusted by providing the atmosphere including humidity around the nozzles and the nozzle face, and the atmosphere including humidity may also adjusted by controlling the amount of the humidity control agent. Moreover, the remaining chemical liquid or the falling chemical liquid droplets may be collected from the nozzles and the nozzle face so that the maintenance for the inkjet head may be more efficiently carried out.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Figure 1:
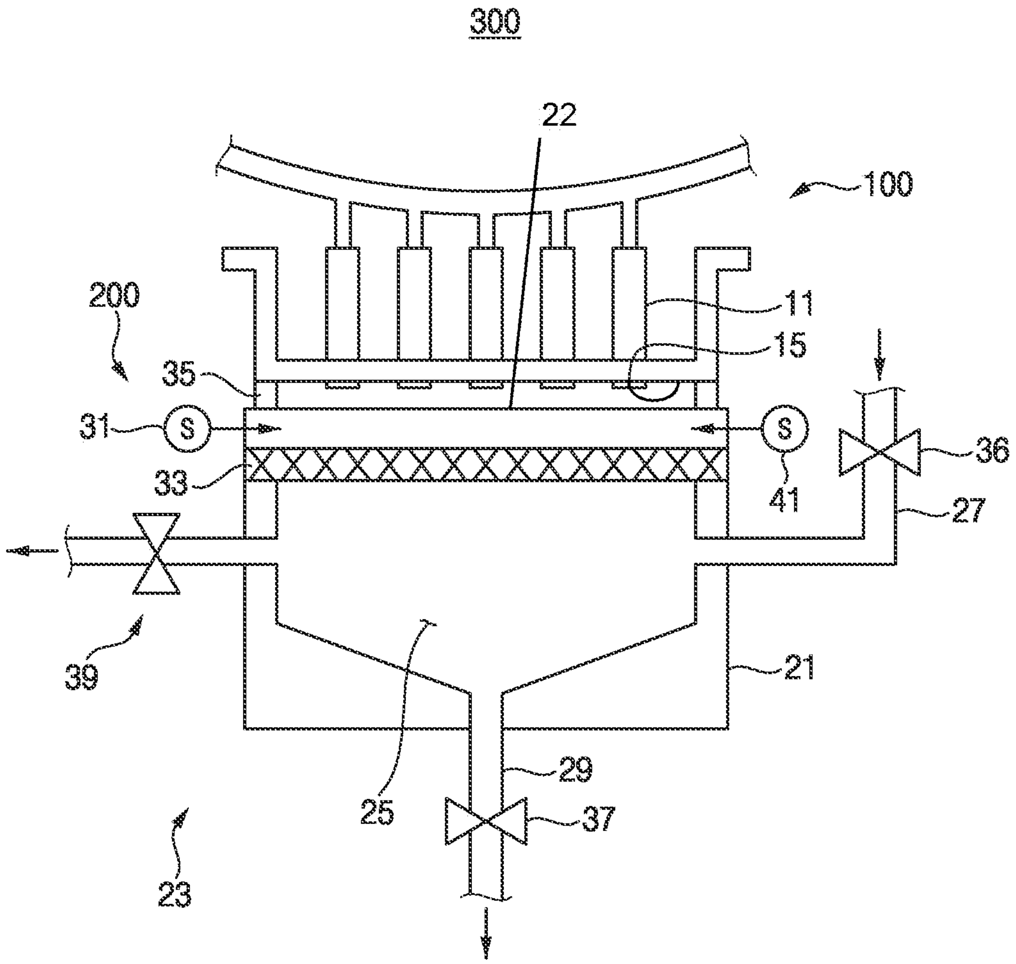
FIGS. 1 and 2 are schematic cross-sectional views illustrating an apparatus for processing a substrate including a maintenance assembly for an inkjet head in accordance with example embodiments of the invention.

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

Figure 2:
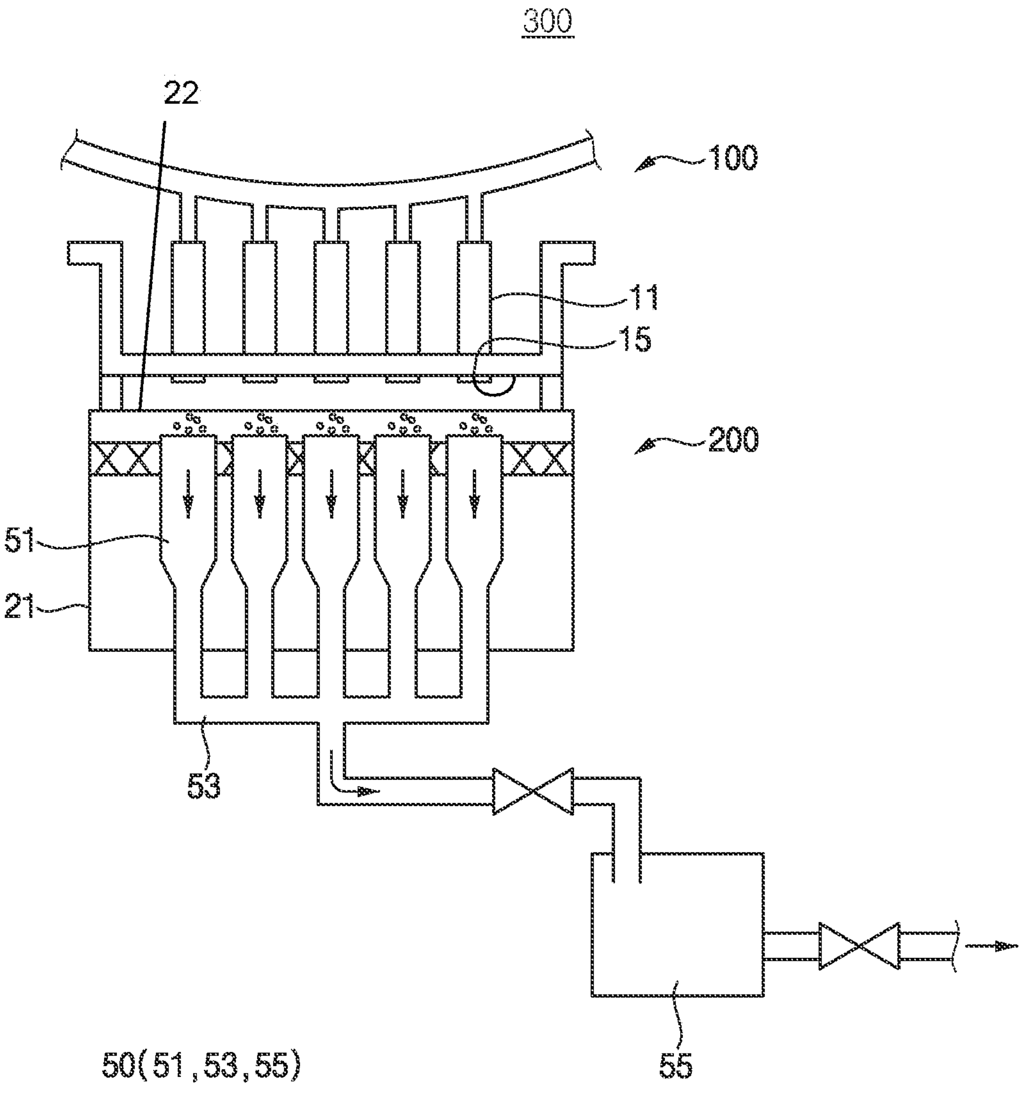
Figure 3:
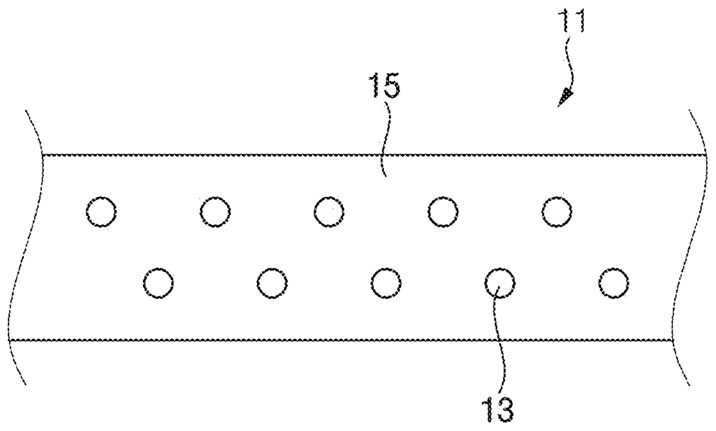
FIG. 3 is a schematic plan view illustrating an inkjet head having a nozzle face in accordance with example embodiments of the invention.

FIGS. 1 and 2 are schematic cross-sectional views illustrating an apparatus for processing a substrate including a maintenance assembly for an inkjet head in accordance with example embodiments of the invention. FIG. 3 is a schematic plan view illustrating an inkjet head having a nozzle face in accordance with example embodiments of the invention.

Referring to FIGS. 1 to 3, an apparatus for processing a substrate 300 according to example embodiments may include a chemical liquid discharging part 100 having an inkjet head 11 and a maintenance assembly 200 for the inkjet head 11.

In the apparatus for processing a substrate 300, the inkjet head 11 of the chemical liquid discharging part 100 may discharge a predetermined chemical liquid, which may include a red (R) ink, a green (G) ink, a blue (B) inkjet head, or a photoresist, onto a substrate for manufacturing a display device such as an organic light emitting display (OLED) device or a quantum dot light emitting display (QLED) device. In example embodiments, the apparatus for processing a substrate 300 may include a chemical liquid discharging part 100 having a plurality of inkjet heads 11 provided by a unit of pack.

The inkjet head 11 of the chemical liquid discharging part 100 may have a plurality of nozzles 13 for providing the chemical liquid onto the substrate. In example embodiments, the inkjet head 11 may have a nozzle face 15 including the plurality of nozzles 13 arranged by a substantially constant intervals. If the chemical liquid remains in the plurality of nozzles 13 and the nozzle face 15 having the arranged nozzles 13, a failure of a process for discharging the chemical liquid onto the substrate may be caused by the remaining chemical liquid. Therefore, the chemical liquid remained in the nozzles 13 and/or on the nozzle face 15 is needed to be removed or cleaned. Additionally, a surrounding environment of the chemical liquid is needed to may be properly maintained since the chemical liquid may be relatively sensitive to the surrounding environment including humidity. Furthermore, process conditions including humidity are needed to be advantageously maintained for the nozzles 13 and/or the nozzle face from which the chemical liquid is discharged. In example embodiments, the maintenance assembly 200 may advantageously maintain the surrounding environment including humidity and the process conditions including humidity for the nozzles 13 of the inkjet head 11 and/or the nozzle face 15 of the inkjet head 11.

In example embodiments, the maintenance assembly 200 for the inkjet head 11 may perform maintenance about the inkjet head 11 when the chemical liquid is not discharged onto the substrate from the nozzles 13 of the inkjet head 11. For example, the maintenance assembly 200 may periodically execute the maintenance on the inkjet head 11, or may perform the maintenance about the inkjet head 11 before or after the process for discharging the chemical liquid onto the substrate.

In some example embodiments, the apparatus for processing a substrate 300 may include a stand-alone maintenance assembly 200 for the inkjet head 11. For example, the maintenance assembly 200 may be coupled to the inkjet head 11 when the maintenance assembly 200 performed the maintenance about the inkjet head 11.

As illustrated in FIG. 1, the maintenance assembly 200 for the inkjet head 11 may include a housing 21, an atmosphere generating part 23, a humidity sensing part 31, an atmosphere distributing part 33, a guide part 35, a pressure controlling part 39, an oxygen sensing part 41, and a chemical liquid collecting part 50.

The housing 21 may substantially face the nozzle face 15 of the inkjet head 11 from which the chemical liquid is discharged onto the substrate. That is, the housing 21 may have an upper face 22 substantially corresponding to the nozzles 13 and the nozzle face 15. For example, the housing 21 may have a substantial box structure.

The upper face 22 of the housing 21 may have a size partially covering the inkjet head 11 or may have a size entirely covering the inkjet head 11. Alternatively, the upper face 22 of the housing 21 may have a size entirely covering the chemical liquid discharging part 100 including a plurality of inkjet head 11 provided by the pack unit.

If the upper face 22 of the housing 21 has the size partially covering the inkjet head 11, the maintenance may be performed on a portion of the inkjet head 11 by the maintenance assembly 200 so that the maintenances may be executed several times on the entire inkjet head 11. When the upper face 22 of the housing 21 has the size entirely covering the inkjet head 11, the maintenance assembly 200 may substantially perform the maintenance on the entire inkjet head 11 once.

When the upper face 22 of the housing 21 has the size covering the portion of the inkjet head 11, the maintenance assembly 200 may more carefully perform the maintenance about the entire inkjet head 11 or the plurality of inkjet heads 11 although the maintenance assembly 200 may repeatedly carried out the maintenance. If the upper face 22 of the housing 21 has the size entirely covering the inkjet head 11 or the plurality of inkjet heads 11, time of the maintenance for the entire inkjet head 11 or the plurality of inkjet heads 11 may be shortened.

As described above, in the example embodiments, the maintenance assembly 200 for the inkjet head 11 may advantageously perform the maintenance about the inkjet head(s) 11 considering the size of the inkjet head 11, the number of the inkjet heads 11, the condition of the nozzles 13 and/or the condition of the nozzle face 15 by adjusting the size of the upper face 22 of the housing 21 thereof.

The atmosphere generating part 23 may regulate the surrounding environment including the humidity in the nozzles 13 and/or on the nozzle face 15. In example embodiments, the atmosphere generating part 23 may adjust the humidity surrounding the nozzles 13 and the nozzle face 15 of the inkjet head 11 using a humidity control agent. In this case, an atmosphere generated by the atmosphere generating part 23 may be provided on the nozzles 13 and the nozzle face 15 through the upper face 22 of the housing 21.

In example embodiments, the atmosphere generating part 23 may adjust the humidity in the nozzles 13 and/or on the nozzle face 15 as a predetermined set humidity. In particular, if the humidity the nozzles 13 and/or on the nozzle face 15 is different from the set humidity, the atmosphere generating part 23 may provide the atmosphere regulated using the humidity control agent onto the nozzles 13 and the nozzle face 15 though the upper face 22 of the housing 21.

The atmosphere generating part 23 may include a receiving part 25 for accommodating the humidity control agent therein, a supply line 27 for providing a passage through which the humidity control agent may be supplied from an external humidity control agent source (not illustrated) into the receiving part 25, and a discharge line 29 for discharging the humidity control agent to an outside. The receiving part 25 may be in fluid communication with the upper face 22 of the housing 21 substantially facing the nozzles 13 and the nozzle face 15. The discharge line 29 may discharge a deteriorated humidity control agent or an excessive humidity control agent from the receiving part 25 to the outside.

In some example embodiments, the atmosphere generating part 23 may additionally include a supply adjusting part 36 and a discharge adjusting part 37. The supply adjusting part 36 may control an amount of the humidity control agent supplied into the receiving part 25, and the discharge adjusting part 37 may control an amount of the humidity control agent discharged from the receiving part 25. In this case, the supply adjusting part 36 may be disposed in the supply line 27 and the discharge adjusting part 37 may be disposed in the discharge line 29. For example, the supply adjusting part 36 may include a valve for opening and closing the supply line 27 and the discharge adjusting part 37 may include a valve for opening and closing the discharge line 29.

When the atmosphere generating part 23 may create an atmosphere including a relatively high humidity around the nozzles 13 and the nozzle face 15, smaller amount of the humidity control agent may be supplied into the receiving part 25 and/or larger amount of the humidity control agent may be discharged from the receiving part 25. In contrast, if the atmosphere generating part 23 may form an atmosphere including a relatively low humidity around the nozzles 13 and the nozzle face 15, more large amount of the humidity control agent may be supplied into the receiving part 25 and/or more small amount of the humidity control agent may be discharged from the receiving part 25.

In example embodiments, the supply line 27 may be connected to an upper portion of the receiving part 25 such that the humidity control agent may be easily supplied into the receiving part 25. Additionally, the discharge line 29 may be connected to a lower portion of the receiving part 25 so that the humidity control agent may be easily discharged from the receiving part 25. The receiving part 25 may have the upper portion partially or entirely opened toward the nozzles 13 and the nozzle face 15.

In the maintenance assembly 200 having the above-described configuration, the atmosphere including desired humidity may be formed using the humidity control agent received in the receiving part 25, and then such atmosphere may be provided around the nozzles 13 and the nozzle face 15 of the inkjet head 11 through the upper face 22 of the housing 21. Therefore, the humidity in the nozzles 13 and/or on the nozzle face 15 may be advantageously adjusted to the set humidity. As a result, the surrounding environment including humidity may be advantageously maintained to the nozzles 13 and the nozzle face 15 of the inkjet head 11, which may discharge the chemical liquid onto the substrate.

Referring now to FIG. 1 to FIG. 3, the humidity sensing part 31 may sense and measure the humidity in the nozzles 13 and/or on the nozzle face 15 of the inkjet head 11. Here, the humidity sensing part 31 may be generally adjacent to the nozzles 13 and the nozzle face of the inkjet head 11.

In example embodiments, the supply adjusting part 36 and the discharge adjusting part 37 may respectively regulate the amount of the humidity control agent supplied into the receiving part 25 and the amount of the humidity control agent discharged the receiving part 25 in accordance with the results sensed and measured by the humidity sensing part 25. If the humidity of the nozzles 13 and/or the humidity of the nozzle face 15 measured by the humidity sensing part 31 is lower than the set humidity, the supply adjusting part 36 may provide more large amount of the humidity control agent into the receiving part 25 and/or the discharge adjusting part 37 may discharge more small amount of the humidity control agent from the receiving part 25 such that the atmosphere generating part 23 may form the atmosphere including relative high humidity around the nozzles 13 and the nozzle face 15. If the humidity of the nozzles 13 and/or the humidity of the nozzle face 15 measured by the humidity sensing part 31 is higher than the set humidity, the supply adjusting part 36 may provide more small amount of the humidity control agent into the receiving part 25 and/or the discharge adjusting part 37 may discharge more large amount of the humidity control agent from the receiving part 25 such that the atmosphere generating part 23 may create the atmosphere including relative low humidity around the nozzles 13 and the nozzle face 15. To this end, the supply adjusting part 36 and the discharge adjusting part 37 may include solenoid valves, respectively.

According to example embodiments, the humidity sensing part 31 may continuously sense and measure the humidity of the nozzles 13 and the nozzle face 15 of the inkjet head 11, and the supply adjusting part 36 and/or the discharge adjusting part 37 may regulate the amount of the humidity control agent of the receiving part 25 in accordance with the results measured by the humidity sensing part 31. As a result, the maintenance assembly 200 for the inkjet head 11 may consistently keep the set humidity in the nozzles 13 and/or on the nozzle face 15.

The atmosphere distributing part 33 may substantially uniformly distribute the atmosphere including humidity formed using the humidity control agent around the nozzles 13 and the nozzle face 15 of the inkjet head 11. To this end, the atmosphere distributing part 33 may have a mesh structure including pores arranged by substantially constant distances. Here, each pore of the atmosphere distributing part 33 may have a size which may not enable chemical liquid droplets falling from the nozzles 13 to pass therethrough. Since the atmosphere including humidity may be substantially uniformly distributed around the nozzles 13 and the nozzle face 15 of the inkjet head 11 using such atmosphere distributing part 33, the maintenance assembly 200 may more efficiently maintain the inkjet head 11 having the nozzles 13 and the nozzle face 15.

During performing the maintenance about the inkjet head 11 using the maintenance assembly 200, the atmosphere including humidity may not formed around the nozzles 13 and the nozzle face 15 if the upper face 22 of the housing 21 makes contact with the nozzle face 15 and/or the nozzles 13. Further, if the upper face 22 of the housing 21 is very close to the nozzle face 15 and/or the nozzles 13, the atmosphere including humidity may not be uniformly distributed relative to the entire nozzles 13 and the nozzle face 15. Considering these problems, the maintenance assembly 200 may include a guide part 35 which may keep a substantially constant distance among the upper face 22 of the housing 21 and the nozzles 13 and/or the nozzle face 15. The guide part 35 may have a fence structure surrounding the upper face 22 of the housing 21 such that the upper face 22 of the housing 21 may be separated from the nozzles 13 and/or the nozzle face 15 by the substantially constant distance. In this case, the guide part 35 may enable the upper face 22 of the housing 21 to sufficiently close to the nozzle face 15 of the inkjet head 11 so that the atmosphere including humidity may not be leaked from the upper face 22 of the housing 21 and the nozzle face 15. Using such a guide part 35, the maintenance assembly 200 may more effectively maintain the inkjet head 11 having the nozzles 13 and the nozzle face 15.

Since the guide part 35 may keep the upper face 22 of the housing 21 to sufficiently close to the nozzle face 15 of the inkjet head 11, pressure of the atmosphere generating part 23 may continuously increase when the atmosphere including humidity is constantly provided around the nozzles 13 and the nozzle face 15. In this case, the nozzles 13 and/or the nozzle face 15 of the inkjet head 11 may be damaged by the increased pressure. To prevent the damages to the nozzles 13 and/or the damage to the nozzle face 15 by the increased pressure, the pressure controlling part 39 may maintain a substantially constant pressure between the receiving part 25 and the nozzle face 15 of the inkjet head 11 during continuously providing of the atmosphere including humidity around the nozzles 13 and the nozzle face 15. In example embodiments, the pressure controlling part 39 may partially discharge the atmosphere including humidity toward an outside so that the increased pressure applied to the nozzle face 15 of the inkjet head 11 may be reduced. For example, the pressure controlling part 39 may discharge a portion of the atmosphere including humidity in a vacuum suction manner. The maintenance assembly 200 for the inkjet head 11 may continuously create the atmosphere including humidity around the nozzles 13 and the nozzle face 15 while maintaining the sufficient close distance between the upper face 22 of the housing 21 and the nozzle face 15 and also preventing the damages to the nozzles 13 and/or the damage to the nozzle face 15 using the pressure controlling part 39. Accordingly, the efficiency of the maintenance of the inkjet head 11 performed by the maintenance assembly 200 may be more improved.

In example embodiments, the humidity control agent for forming the atmosphere including humidity may include a desiccant in a granular form, a dehumidifying agent in a granular form, or a combination thereof. For example, the humidity control agent may include silica gel, zeolite, etc.

Referring now FIG. 1 to FIG. 3, the oxygen sensing part 41 of the maintenance assembly 200 may sense and measure an amount of oxygen in the nozzles 13 and/or on the nozzle face 15 of the inkjet head 11. The oxygen sensing part 41 may maintain the amount of oxygen in the nozzles 13 and/or on the nozzle face 15 within a predetermined set range thorough the adjustment of the humidity control agent in the receiving part 25 using the supply adjusting part 35 and/or the discharge adjusting part 37 if the measured amount of oxygen deviates from the predetermined set range. Using the oxygen sensing part 41, the amount of oxygen in the nozzles 13 and/or on the nozzle face 15 may be measured and the amount of oxygen in the nozzles 13 and/or on the nozzle face 15 may be maintained within the set range such that the humidity of the atmosphere including humidity may be more exactly controlled. Therefore, the efficiency of the maintenance of the inkjet head 11 performed by the maintenance assembly 200 may be more enhanced. As a result, the maintenance assembly 200 for the inkjet head 11 may more exactly meet the process conditions in which the chemical liquid sensitive to the surrounding environment including humidity and easily deteriorated, for example, the chemical liquid including the red inkjet head, the green inkjet head, the blue inkjet head or the photoresist for manufacturing the display device is used.

While performing the maintenance of the inkjet head 11 using the maintenance assembly 200, the chemical liquid droplets remaining in the nozzles 13 and/or on the nozzle face 15 may frequently fall onto the maintenance assembly 200. If such falling chemical liquid droplets flows into the receiving part 25, the atmosphere including humidity may not be properly created by the atmosphere generating part 23 as well as a failure of the atmosphere generating part 23 may be caused. To this end, the chemical liquid collecting part 50 may collect the chemical liquid remaining in the nozzles 13 and/or on the nozzle face 15, or the chemical liquid droplets falling from the inkjet head 11. For example, the chemical liquid collecting part 50 may collect the remaining chemical liquid or the falling chemical liquid droplets in a vacuum suction manner.

In example embodiments, the chemical liquid collecting part 50 may include a chemical liquid receiving part 51, a connection line 53 and a chemical liquid discharge part 55. The chemical liquid receiving part 51 may collect the remaining chemical liquid or the falling chemical liquid droplets from the nozzles 13 and the nozzle face 15. The connection line 53 may be coupled to the chemical liquid receiving part 51 and the chemical liquid discharge part 55. The chemical liquid discharge part 55 may temporarily store the chemical liquid from the chemical liquid receiving part 51 and may discharge the stored chemical liquid to an outside.

As illustrated in FIG. 1, the chemical liquid receiving part 51 and the connection line 53 may be disposed in an inside of the housing 21 whereas the chemical liquid discharge part 55 may be positioned at an outside of the housing 21. The chemical liquid receiving part 51 may have a size substantially corresponding to the size of the nozzle face 15 of the inkjet head 11. Alternatively, the chemical liquid receiving part 51 may have a size substantially corresponding to each of the plurality of inkjet heads 11 provided by the pack unit. If the apparatus for processing a substrate 300 includes the plurality of inkjet heads 11 provided by the pack unit, the chemical liquid collecting part 50 may include a plurality of chemical liquid receiving parts 51, a plurality of branched connection lines coupled to the plurality of chemical liquid receiving parts 51, and one connection line connected to the plurality of branched connection lines.

In example embodiments, the chemical liquid collecting part 50 may include a vacuum pump capable of collecting the remaining chemical liquid or the falling chemical liquid droplets from the nozzles 13 and the nozzle face 15. Here, the vacuum pump may be adjacent to the chemical liquid receiving part 51, or may be adjacent to the chemical liquid discharge part 55. If the chemical liquid receiving part 51 has an inlet lower than an inlet of the receiving part 25, the falling chemical liquid droplets from the nozzles 13 and the nozzle face 15 may directly flow into the receiving part 25. Considering this problem, the inlet of the chemical liquid receiving part 51 may be positioned higher than the inlet of the receiving part 25. Additionally, the inlet of the chemical liquid receiving part 51 may be located higher than the atmosphere distributing part 33. Therefore, the chemical liquid or the chemical liquid droplets not collected into the chemical liquid receiving part 51 may not directly flow into the receiving part 25 by the atmosphere distributing part 33.

According to example embodiments, when the process for discharging the chemical liquid onto the substrate from the inkjet head 11 is not performed, the maintenance assembly 200 for the inkjet head 11 may perform the maintenance to the inkjet head 11 so that the nozzles 13 and/or the nozzle face 15 may have the predetermined set humidity. In particular, the humidity in the nozzles 13 and/or on the nozzle face 15 of the inkjet head 11 may be measured, and the humidity in the nozzles 13 and/or on the nozzle face 15 may be adjusted to the predetermined set humidity in accordance with the measured results if the measured humidity in the nozzles 13 and/or on the nozzle face 15 is different from the set humidity. In this case, the maintenance assembly 200 may be readily coupled/separated to/from the inkjet head 11 such that the maintenance for the inkjet head 11 may be easily performed. Further, the humidity of the nozzles 13 and the humidity of the nozzle face 15 may be advantageously adjusted by providing the atmosphere including humidity around the nozzles 13 and the nozzle face 15, and the atmosphere including humidity may also adjusted by controlling the amount of the humidity control agent. Moreover, the remaining chemical liquid or the falling chemical liquid droplets may be collected from the nozzles 13 and the nozzle face 15 so that the maintenance for the inkjet head 11 may be more efficiently carried out.

In the apparatus for processing a substrate 300 including the maintenance assembly 200 according to example embodiments, the surrounding environment including humidity relative to the nozzles 13 and the nozzles may be effectively maintained, and thus the failure of the process for discharging the chemical liquid onto the substrate may be prevented. The maintenance method using such maintenance assembly 200 and the apparatus for processing a substrate 300 having the maintenance assembly 200 may be advantageously employed in manufacturing the display device such as the organic light emitting display or the quantum dot light emitting display.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A maintenance assembly for an inkjet head, the maintenance assembly comprising:

a housing having an upper face that faces a nozzle face of the inkjet head, the nozzle face including nozzles, and the nozzles being configured to discharge a chemical liquid; and an atmosphere generating part configured to adjust humidity around the nozzles and the nozzle face, wherein in response to a humidity of the nozzles and a humidity of the nozzle face being different from a first humidity, the atmosphere generating part is configured to adjust the humidity of the nozzles and the humidity of the nozzle face to the first humidity, and the atmosphere generating part includes a receiving part in fluid communication with the upper face of the housing and configured to receive a humidity control agent, a supply line configured to provide the humidity control agent into the receiving part from an external humidity control agent source, and a discharge line configured to discharge the humidity control agent from the receiving part to an outside.

2. The maintenance assembly for the inkjet head of claim 1, further comprising:

a supply adjusting part configured to control an amount of the humidity control agent provided into the receiving part; and a discharge adjusting part configured to control an amount of the humidity control agent discharged from the receiving part.

3. The maintenance assembly for the inkjet head of claim 2, further comprising a humidity sensing part configured to measure the humidity of the nozzles and the humidity of the nozzle face, wherein the supply adjusting part and the discharge adjusting part are configured to adjust the amount of the humidity control agent provided into the receiving part and the amount of the humidity control agent discharged from the receiving part in accordance with results measured by the humidity sensing part.

4. The maintenance assembly for the inkjet head of claim 1, further comprising a pressure controlling part configured to constantly maintain a pressure between the upper face of the housing and the nozzle face.

5. The maintenance assembly for the inkjet head of claim 1, wherein the humidity control agent is at least one of a desiccant in a granular form, a dehumidifying agent in a granular form, or a combination thereof.

6. The maintenance assembly for the inkjet head of claim 1, further comprising an atmosphere distributing part configured to uniformly distribute the humidity around the nozzles and the nozzle face wherein the atmosphere distributing part has a mesh structure.

7. The maintenance assembly for the inkjet head of claim 1, further comprising a guide part configured to maintain a constant distance between the upper face of the housing and the nozzle face.

8. The maintenance assembly for the inkjet head of claim 1, further comprising a chemical liquid collecting part configured to collect a remaining chemical liquid or a falling chemical liquid from the nozzles and the nozzle face in a vacuum suction manner.

9. The maintenance assembly for the inkjet head of claim 8, wherein the chemical liquid collecting part includes a chemical liquid receiving part configured to receive the remaining chemical liquid or the falling chemical liquid, a chemical liquid discharging part configured to temporarily store and discharge the remaining chemical liquid or the falling chemical liquid, and a connection line coupled to the chemical liquid receiving part and the chemical liquid discharging part.

10. A maintenance method of a maintenance assembly for an inkjet head, the maintenance method comprising:

measuring a humidity of nozzles configured to discharge a chemical liquid and a humidity of a nozzle face including the nozzles, wherein the inkjet head includes the nozzle face and the maintenance assembly includes a housing having an upper face that faces the nozzle face; and adjusting the humidity of the nozzles and the humidity of the nozzle face to a first humidity in response to the measured humidity of the nozzles and the measured humidity of the nozzle face being different from the first humidity, wherein the maintenance assembly includes an atmosphere generating part that is configured to adjust the humidity of the nozzles and the humidity of the nozzle face, and the atmosphere generating part includes a receiving part in fluid communication with the upper face of the housing and configured to receive a humidity control agent, a supply line configured to provide the humidity control agent into the receiving part from an external humidity control agent source, and a discharge line configured to discharge the humidity control agent from the receiving part to an outside.

11. The maintenance method for the inkjet head of claim 10, wherein the humidity of the nozzles and the humidity of the nozzle face are adjusted using the humidity control agent around the nozzles and the nozzle face, and the humidity control agent is at least one of a desiccant in a granular form, a dehumidifying agent in a granular form, or a combination thereof.

12. The maintenance method for the inkjet head of claim 10, further comprising collecting a remaining chemical liquid or a falling chemical liquid from the nozzles and the nozzle face in a vacuum suction manner.

13. The maintenance method for the inkjet head of claim 10, wherein the adjusting of the humidity of the nozzles and the humidity of the nozzle face is performed when the nozzles do not discharge the chemical liquid.

14. An apparatus comprising:

an inkjet head having a nozzle face, the nozzle face including nozzles and the nozzles being configured to discharge a chemical liquid; and a maintenance assembly configured to perform a maintenance of the inkjet head, the maintenance assembly comprising, a housing having an upper face that faces the nozzle face; and an atmosphere generating part configured to adjust a humidity of the nozzles and a humidity of the nozzle face to a first humidity by controlling humidity around the nozzles and the nozzle face using a humidity control agent, such that the humidity of the nozzles and a humidity of the nozzle face being adjusted in response to the humidity of the nozzles and the humidity of the nozzle face being different from the first humidity, wherein the atmosphere generating part includes, a receiving part in fluid communication with the upper face of the housing and configured to receive the humidity control agent, a supply line configured to provide the humidity control agent into the receiving part from an external humidity control agent source, and a discharge line configured to discharge the humidity control agent from the receiving part to an outside.

15. The apparatus of claim 14, wherein the atmosphere generating part further includes a supply adjusting part configured to control an amount of the humidity control agent provided into the receiving part, and a discharge adjusting part configured to control an amount of the humidity control agent discharged from the receiving part.

16. The apparatus of claim 15, further comprising a humidity sensing part configured to measure the humidity of the nozzles and the humidity of the nozzle face, wherein the supply adjusting part and the discharge adjusting part are configured to adjust the amount of the humidity control agent provided into the receiving part and the amount of the humidity control agent discharged from the receiving part in accordance with results measured by the humidity sensing part.

17. The apparatus of claim 14, further comprising:

an atmosphere distributing part configured to uniformly distribute the humidity around the nozzles and the nozzle face wherein the atmosphere distributing part has a mesh structure; and a guide part configured to maintain a constant distance between the upper face of the housing and the nozzle face.

18. The apparatus of claim 14, wherein the humidity control agent is selected from a desiccant in a granular form, a dehumidifying agent in a granular form and a combination thereof.

19. The apparatus of claim 14, further comprising:

a chemical liquid collecting part configured to collect a remaining chemical liquid or a falling chemical liquid from the nozzles and the nozzle face in a vacuum suction manner, wherein the chemical liquid collecting part includes a chemical liquid receiving part configured to receive the remaining chemical liquid or the falling chemical liquid, a chemical liquid discharging part configured to temporarily store and discharge the remaining chemical liquid or the falling chemical liquid, and a connection line coupled to the chemical liquid receiving part and the chemical liquid discharging part.

* * * * *